(12) United States Patent
Yufu

(10) Patent No.: US 10,596,795 B2
(45) Date of Patent: Mar. 24, 2020

(54) DECORATIVE-SHEET MANUFACTURING METHOD

(71) Applicant: RIKEN TECHNOS CORPORATION, Tokyo-to (JP)

(72) Inventor: Kazutaka Yufu, Tokyo-to (JP)

(73) Assignee: RIKEN TECHNOS CORPORATION, Tokyo-to (JP)

( * ) Notice: Subject to any disclaimer, the term of this patent is extended or adjusted under 35 U.S.C. 154(b) by 0 days.

(21) Appl. No.: 15/515,320

(22) PCT Filed: Oct. 21, 2015

(86) PCT No.: PCT/JP2015/079736
§ 371 (c)(1),
(2) Date: Mar. 29, 2017

(87) PCT Pub. No.: WO2016/063920
PCT Pub. Date: Apr. 28, 2016

(65) Prior Publication Data
US 2017/0217145 A1 Aug. 3, 2017

(30) Foreign Application Priority Data
Oct. 21, 2014 (JP) .................................. 2014-214123

(51) Int. Cl.
*B32B 37/10* (2006.01)
*B32B 27/00* (2006.01)
(Continued)

(52) U.S. Cl.
CPC .............. *B32B 37/10* (2013.01); *B29C 63/04* (2013.01); *B29C 66/0244* (2013.01);
(Continued)

(58) Field of Classification Search
CPC . B29C 66/0244; B29C 66/0342; B29C 63/04; B32B 2451/00; B32B 27/00;
(Continued)

(56) References Cited

U.S. PATENT DOCUMENTS 3,496,059 A * 2/1970 Rasmussen ....... B29C 66/73712
428/198
5,429,696 A * 7/1995 Rohleder .............. B29C 59/046
156/182
(Continued)

FOREIGN PATENT DOCUMENTS

EP 0495646 A1 * 7/1992 ......... B29C 43/3642
JP 53-90382 8/1978
(Continued)

OTHER PUBLICATIONS

English translation of JP63222838.*
(Continued)

*Primary Examiner* — Sonya M Sengupta
(74) *Attorney, Agent, or Firm* — Wenderoth, Lind & Ponack, L.L.P.

(57) ABSTRACT

A method for producing a decorative sheet includes the steps of: (α) pressing a thermoplastic resin film (a) on a preheated rotating heating drum, and then pressing a transfer film (b) having a hot-melt adhesive layer, a resin coating, a release coating layer, and a film base material in order such that the hot-melt adhesive layer is positioned in the film (a) side; (β) feeding/supplying a pressed body obtained in the Step (α) between a rotating design-imparting roll and a rotating receiving roll such that the transfer film (b) is positioned in the design-imparting-roll side; and (γ) sequentially passing a laminated sheet obtained in the Step (β) through a first chill roll whose temperature is set to 50° C. to 90° C., and a second chill roll whose temperature is set to a temperature of 20° C. to 70° C. which is lower than the first-chill roll temperature to cool the laminated sheet.

8 Claims, 1 Drawing Sheet

(51) Int. Cl.
  *B29C 65/00* (2006.01)
  *B29C 63/04* (2006.01)
  *B32B 7/12* (2006.01)
  *B32B 27/06* (2006.01)
  *B32B 37/06* (2006.01)

(52) U.S. Cl.
  CPC ............ *B29C 66/0342* (2013.01); *B32B 7/12* (2013.01); *B32B 27/00* (2013.01); *B32B 27/06* (2013.01); *B32B 37/06* (2013.01); *B32B 2451/00* (2013.01)

(58) Field of Classification Search
  CPC ......... B32B 27/06; B32B 37/06; B32B 37/10; B32B 7/12
  USPC .............................................. 156/311, 477.1
  See application file for complete search history.

(56) References Cited

U.S. PATENT DOCUMENTS

| | | | | |
|---|---|---|---|---|
| 5,637,171 | A * | 6/1997 | Kasahara | B29C 43/3642 156/209 |
| 6,202,624 | B1 * | 3/2001 | Stuerz | F02D 41/0072 123/295 |
| 6,375,776 | B1 * | 4/2002 | Buoni | B29D 11/00605 156/209 |

FOREIGN PATENT DOCUMENTS

| | | |
|---|---|---|
| JP | 63-222838 | 9/1988 |
| JP | 4-241943 | 8/1992 |
| JP | 5-56427 | 7/1993 |
| JP | 7-329266 | 12/1995 |
| JP | 2002-103544 | 4/2002 |
| JP | 2005-271349 | 10/2005 |
| JP | 2007-125773 | 5/2007 |

OTHER PUBLICATIONS

English translation of JP2005271349.*
English translation of Written Opinion of WO2016063920.*
English translation of JP2002103544.*
English translation of JP2007125773.*
Patent family for JP04-241943.*
International Search Report dated Jan. 19, 2016 in corresponding International Application No. PCT/JP2015/079736.
International Preliminary Report on Patentability dated May 4, 2017 in corresponding International Application No. PCT/JP2015/079736.
Office Action dated Aug. 2, 2018 in corresponding Chinese Application No. 201580055529.6 (with English translation).
Office Action dated Feb. 28, 2019 in corresponding Chinese Application No. 201580055529.6 (with partial English translation).
Office Action dated Feb. 5, 2019 in corresponding Japanese Application No. 2016-555261 (with English translation).

* cited by examiner

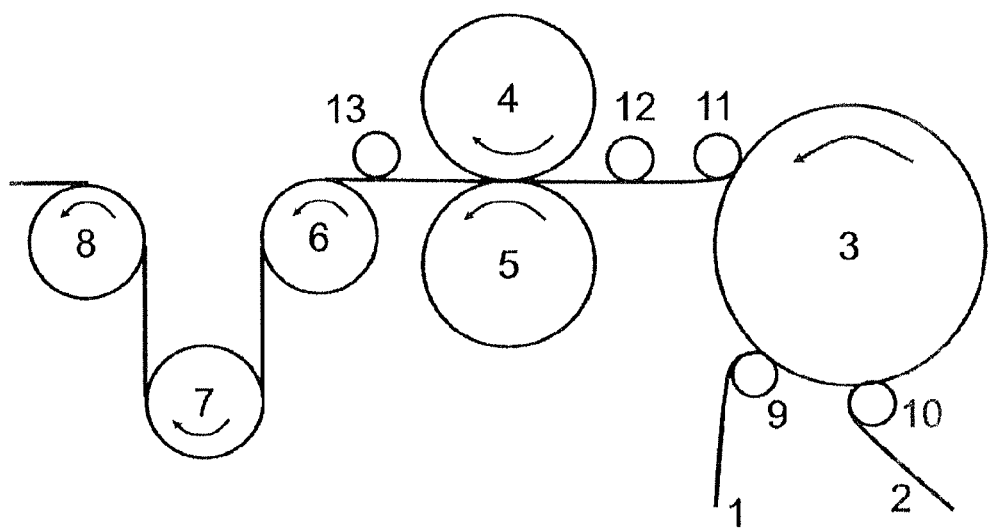

DECORATIVE-SHEET MANUFACTURING METHOD

TECHNICAL FIELD

The present invention relates to a method for producing a decorative sheet. More specifically, the present invention relates to a method for producing a decorative sheet having a resin coating which is free from poor external appearance such as coating streaks or wrinkles, and which has excellent extensibility.

BACKGROUND ART

Conventionally, furniture such as display cabinets, storage cabinets, cupboards, and desks; home electric appliances such as refrigerators, washing machines, air-conditioners, mobile phones, and personal computers; surfaces of base materials composed of woody materials including wood, plywood, laminated wood, particle boards, and hard boards, to be used as building components for floors, walls, bath rooms, and the like; and surfaces of base materials composed of metallic materials including iron and aluminum; are decorated by lamination with decorative sheets to provide products for use. Decorative sheets are required to have not only decorative properties, but also high levels of scratch resistance, abrasion resistance, stain resistance, and the like in a well-balanced manner.

For imparting the properties described above to a decorative sheet, formation of a resin coating on the surface of the thermoplastic resin film to be used as the base material is widely carried out by application of a resin composition coating material. However, there is a problem that coating streaks are easily formed during the application of the coating material on the base material. In particular, coating streaks tend to be serious problems in cases where a polyolefin-based resin film, polyester-based resin film, or the like is used as the thermoplastic resin film. There is also a problem that, since a resin coating composed of a resin composition coating material has low extensibility, deformation of the decorative sheet tends to cause cracking of the resin coating during application of the decorative sheet to membrane press forming, vacuum pressure forming, or the like.

In order to solve these problems, "a method for producing a polyvinyl chloride sheet for membrane press forming, comprising pressing a preheated first polyvinyl chloride sheet on a heating drum, further pressing at least one additional layer of preheated polyvinyl chloride sheet thereon, further pressing a transfer film thereon, and then sending the resulting sheet to a design-imparting roll, wherein the transfer film has a structure in which a polyester film, a release coating layer, a resin coating layer, and a hot-melt coating layer are laminated with each other in this order from the outer-layer side" has been proposed (Patent Document 1). However, this technique was also insufficient especially for achieving high-gloss, mirror-like finish.

PRIOR ART DOCUMENT

Patent Document

Patent Document 1: JP 4-241943 A

SUMMARY OF THE INVENTION

Problems to be Solved by the Invention

The present invention aims to provide a method for producing a decorative sheet having a resin coating which is free from poor external appearance such as coating streaks or wrinkles, and which has excellent extensibility.

Means for Solving the Problems

As a result of intensive study, the present inventors discovered that the above object can be achieved by a particular production method.

That is, the present invention is a method for producing a decorative sheet, comprising the steps of:

(α) pressing a thermoplastic resin film (a) on a preheated rotating heating drum, and then pressing a transfer film (b) having a hot-melt adhesive layer, a resin coating, a release coating layer, and a film base material in order from the outermost-layer side on the film (a) such that the hot-melt adhesive layer is positioned in the film (a) side;

(β) feeding/supplying a pressed body obtained in the Step (α) between a rotating design-imparting roll and a rotating receiving roll such that the transfer film (b) is positioned in the design-imparting-roll side; and (γ) sequentially passing a laminated sheet obtained in the Step (β) through a first chill roll whose temperature is set to 50° C. to 90° C., and a second chill roll whose temperature is set to a temperature of 20° C. to 70° C. which is lower than the first-chill roll temperature, to cool the laminated sheet.

The second invention is the method according to the first invention 1, wherein a third chill roll is provided before the first chill roll, and the temperature of the third chill roll is set to a temperature which is higher than the temperature of the first chill roll and lower than the temperature of the laminated sheet obtained in the Step (β).

The third invention is the method according to the first invention or the second invention, wherein a sweeper roll is pressed on each of any one or more selected from the group consisting of the design-imparting roll, receiving roll, heating drum, first chill roll, second chill roll, and third chill roll.

The fourth invention is a decorative sheet produced by the method according to any one of the first to third inventions.

Effect of the Invention

By the production method of present invention, a decorative sheet having a resin coating which is free from poor external appearance such as coating streaks or wrinkles, and which has excellent extensibility can be easily obtained. Therefore, the decorative sheet obtained by the production method of present invention has excellent membrane press formability, vacuum formability, vacuum pressure formability, and wrapping formability, and can be preferably used for decoration of, for example, furniture such as display cabinets, storage cabinets, cupboards, and desks; home electric appliances such as refrigerators, washing machines, air-conditioners, mobile phones, and personal computers; and building components for floors, walls, bath rooms, and the like.

BRIEF DESCRIPTION OF THE DRAWING

FIG. 1 is a schematic diagram showing a preferred embodiment of the production method of the present invention.

MODE FOR CARRYING OUT THE INVENTION

Step (α)

(α) pressing a thermoplastic resin film (a) on a preheated rotating heating drum, and then pressing a transfer film (b)

having a hot-melt adhesive layer, a resin coating, a release coating layer, and a film base material in order from the outermost-layer side on the film (a) such that the hot-melt adhesive layer is positioned in the film (a) side.

The heating drum has a function to preheat the thermoplastic resin film (a) and the transfer film (b) so that the film (a) and the film (b) adhere to each other with a sufficient interlayer strength, and so that an arbitrary design can be given to the surface of the resin coating of the film (b), in the subsequent Step (β). Thus, the temperature of the heating drum is usually set to not less than 100° C., preferably not less than 130° C., although the temperature may vary depending on the type of the film (a). From the viewpoint of preventing troubles in molding such as cases where the film (a) cannot be detached from the heating drum, the temperature of the heating drum is usually set to not more than 210° C., preferably not more than 190° C., although the temperature may vary depending on the type of the film (a).

The pressing is carried out in the following order: first, the thermoplastic resin film (a) is pressed on the heating drum, and then the transfer film (b) is pressed thereon. By this, the trouble that air is caught between the layers of the film (a) and the film (b) can be suppressed.

The thermoplastic resin film (a) is the film to be used as the base material of the decorative sheet obtained by the production method of the present invention. As described below, from the viewpoint of the membrane press formability, vacuum formability, vacuum pressure formability, and wrapping formability, the thermoplastic resin film (a) is especially preferably a polyvinyl chloride-based resin film or an amorphous or low-crystallinity aromatic polyester-based resin film. The polyvinyl chloride-based resin film and the amorphous or low-crystallinity aromatic polyester-based resin film are described later.

The transfer film (b), which has, a hot-melt adhesive layer, a resin coating, a release coating layer, and a film base material in order from the outermost-layer side, is used for giving a coating to the decorative sheet obtained, which coating is free from coating streaks and has excellent extensibility.

The release coating layer and the film base material of the film (b) are detached/removed at the interface between the resin coating and the release coating layer after Step (α) but before proceeding to Step (β), after Step (β) but before proceeding to Step (γ), or after Step (γ). Thus, the decorative sheet obtained by the production method of the present invention is a laminated sheet having the resin coating, the hot-melt adhesive layer and the film (a) in order from the outer-layer side.

Although polyvinyl chloride-based resin films and amorphous or low-crystallinity aromatic polyester-based resin films have excellent membrane press formability, vacuum formability, vacuum pressure formability, and wrapping formability, they have only insufficient rigidity, heat resistance, and solvent resistance as film base materials to which resin composition coating materials are to be applied for formation of coatings on their surfaces, and easily have coating streaks thereon. Further, since rigidity and the like of the film base material need to be taken into account, the design of the coating material and the conditions for application of the coating material are limited, so that a coating material having excellent extensibility cannot be easily obtained. On the other hand, films having excellent rigidity, heat resistance, and solvent resistance with which favorable coatings can be formed on their surfaces have only insufficient membrane press formability, vacuum formability, vacuum pressure formability, and wrapping formability.

In view of this, the production method of the present invention enabled production of a decorative sheet having a resin coating which is free from coating streaks and which has excellent extensibility by a process using a film having excellent rigidity, heat resistance, and solvent resistance as the base material, and using a transfer film (b) in which the release coating layer, the resin coating, and the hot-melt adhesive layer are formed in this order, wherein the film (b) is pressed on a film (a) such that the hot-melt adhesive layer is positioned in the film (a) side, and the resulting sheet is compressed/laminated in the subsequent Step (β).

For the pressing of the thermoplastic resin film (a) on the preheated rotating heating drum, the film (a) may be preheated in advance. Similarly, for the pressing of the transfer film (b) on the film (a) such that the hot-melt adhesive layer is positioned in the film (a) side, the film (b) may be preheated in advance.

Step (β)

The production method of the present invention comprises the step of: (β) feeding/supplying a pressed body obtained in the Step (α) between a rotating design-imparting roll and a rotating receiving roll such that the transfer film (b) is positioned in the design-imparting-roll side.

By the feeding/supplying of the pressed body formed in the Step (α) between the rotating design-imparting roll and the rotating receiving roll such that the transfer film (b) is positioned in the design-imparting-roll side, the pressed body is strongly compressed to allow adhesion of the thermoplastic resin film (a) and the film (b) to each other with a sufficient interlayer strength, resulting in imparting of an arbitrary design to the release coating side of the resin coating of the film (b). Thus, the design-imparting roll is preheated usually at not less than 10° C., preferably not less than 40° C. For prevention of troubles in molding, the preheating temperature of the design-imparting roll is usually not more than 150° C., preferably not more than 120° C. The receiving roll is usually not preheated. However, whether or not the receiving roll is to be preheated is not limited, and the receiving roll may be preheated, if desired.

As the design-imparting roll, a metal-surfaced roll is usually used. However, the design-imparting roll is not limited, and may be an arbitrary roll such as a roll having a ceramic surface, or a roll having a heat-resistant rubber surface including a silicone rubber surface.

In cases where a mirror-surface roll is used as the design-imparting roll, a high-gloss, mirror-like design is applied to the release coating side of the resin coating of the transfer film (b).

In cases where the detachment/removal of the release coating layer and the film base material of the transfer film (b) is carried out later than Step (β), the compression of the resin coating by the mirror-surface roll is carried out via the release coating layer and the film base material. Thus, since the side which directly compresses the resin coating is the resin coating side of the release coating layer, the resin coating side of the release coating layer is preferably highly smooth. For example, after the formation of the release coating layer but before the formation of the resin coating in production of the film (b), the resin coating formation surface (resin-coating side) of the release coating layer has a 60° gloss of preferably not less than 80%, more preferably not less than 88%, still more preferably not less than 90% as measured according to JIS K 7105-1981.

In cases where an engraved roll is used as the design-imparting roll, a concave-convex pattern design is applied to the release coating side of the resin coating of the transfer film (b). For favorable engraving of the concave-convex pattern of the engraved roll onto the release coating side of the resin coating of the transfer film (b), the release coating layer and the film base material of the transfer film (b) are preferably removed after Step (α) but before proceeding to Step (β) so that the engraved roll can directly compress the resin coating.

The concave-convex pattern is arbitrary selected from a design point of view. Examples of the concave-convex pattern include designs mimicking natural materials, such as wood grain patterns and leather grain patterns; processed-metal-like hairline patterns; geometric abstract patterns such as checkered patterns, stripe patterns, and polka dot patterns. These may be used individually, or two or more of these may be used in combination.

The method of the engraving of the concave-convex pattern on the engraved roll is not limited, and the engraving may be carried out by an arbitrary method. Examples of the method include the embossing method using an engraving mill roll, and the etching method by acid corrosion; the mechanical engraving method using a diamond stylus; the laser engraving method using a $CO_2$ laser, YAG laser, or the like; and the sand blasting method.

The surface of the design-imparting roll may be subjected to chrome plating; iron-phosphorus alloy plating; hard carbon treatment by the PVD method or the CVD method; or the like for the purpose of protection from corrosion and scratching.

As the receiving roll, a roll having a heat-resistant rubber surface such as a silicone rubber surface is usually used. However, the receiving roll is not limited, and an arbitrary roll may be used.

Step (γ)

The production method of the present invention comprises the step of: (γ) sequentially passing a laminated sheet obtained in the Step (β) through a first chill roll whose temperature is set to 50° C. to 90° C., and a second chill roll whose temperature is set to a temperature of 20° C. to 70° C. which is lower than the first-chill roll temperature, to cool the laminated sheet.

Conventionally, cooling of the laminated sheet has been carried out rapidly by setting the temperature of the first chill roll to a sufficiently low temperature. However, the present inventors discovered that the poor external appearance such as wrinkles that appears on the resin coating is due to a difference in the constriction behavior that occurs upon rapid cooling between the thermoplastic resin film (a), which is thermoplastic, and the resin coating of the transfer film (b), and that, by setting the chill roll temperature such that the temperature sequentially changes from a high temperature to a low temperature so that the cooling gradually proceeds, the poor external appearance due to the difference in the constriction behavior can be prevented.

Since the heating drum is preheated usually at 100° C. to 210° C., preferably at 130° C. to 190° C., and the design-imparting roll is preheated usually at 10° C. to 150° C., preferably at 40° C. to 120° C., the temperature condition of the laminated sheet obtained in the Step (β) is usually about 90° C. to 150° C., preferably about 100° C. to 120° C. before proceeding to Step (γ). In view of this, the temperature of the first chill roll, through which the laminated sheet is passed first, is set to 50° C. to 90° C., preferably 70° C. to 80° C. The temperature of the second chill roll, through which the laminated sheet is passed subsequently, is set to 20° C. to 70° C., preferably 50° C. to 60° C. such that the temperature is lower than the temperature of the first chill roll.

Further, for cooling the sheet more slowly, it is also preferred to provide a third chill roll before the first chill roll, and to set the temperature of the third chill roll to a temperature which is higher than the temperature of the first chill roll but lower than the temperature of the laminated sheet.

The first chill roll does not necessarily need to be a single chill roll, and a plurality of consecutive chill rolls may be used as the first chill roll. The same applies to the second chill roll and the third chill roll.

The production method of the present invention is described below in more detail with reference to FIG. 1. FIG. 1 is a schematic diagram showing a preferred embodiment of the production method of the present invention. A thermoplastic resin film (a) 1 is pressed by a pressure roll 9 on a heating drum 3 preheated at a temperature of 100° C. to 210° C., preferably at a temperature of 130° C. to 190° C., which heating drum 3 is rotating in the direction indicated by an arrow. The pressure roll 9 may also be used as a preheating roll. Subsequently, a transfer film (b) 2, having a hot-melt adhesive layer, a resin coating, a release coating layer, and a film base material in order from the outermost-layer side, is pressed on the film (a) 1 by a pressure roll 10 such that the hot-melt adhesive layer is positioned in the film (a) 1-side. The pressure roll 10 may also be used as a preheating roll. At a guide roll 11, the thus obtained pressed body is released from the heating drum 3.

The released pressed body is fed/supplied and compressed between a design-imparting roll 4 which is preheated at a temperature of 10° C. to 150° C., preferably 40° C. to 120° C., and which is rotating in the direction indicated by an arrow, and a receiving roll 5 which is rotating in the direction indicated by an arrow, such that the transfer film (b) 2 is positioned in the design-imparting-roll-4-side. By this, the thermoplastic resin film (a) 1 and the transfer film (b) 2 adhere to each other with a sufficient interlayer strength, to produce a laminated sheet 14. On the release coating side of the resin coating of the film (b) 2, a design corresponding to that of the design-imparting roll 4 is applied.

In this process, the line speed of the heating drum 3 and the line speed of the design-imparting roll 4 may be or may not be synchronized. If desired, the line speed of the design-imparting roll 4 may be increased by about 1 to 20% relative to the line speed of the heating drum 3, or, conversely, the line speed of the design-imparting roll 4 may be decreased by about 1 to 3% relative to the line speed of the heating drum 3.

On the design-imparting roll 4, a sweeper roll 15 is pressed. The sweeper roll 15 is a roll having a rubber surface such as a butyl rubber surface, silicone rubber surface, or a fluorine rubber surface, and has a function to remove foreign substances attached to the design-imparting roll 4 to improve the yield of the product. One or more similar sweeper rolls may be provided on one or more of the heating drum 3, receiving roll 5, and chill rolls 6, 7, and 8.

The laminated sheet obtained as described above is slowly cooled by being allowed to pass through the chill rolls 6, 7, and 8 sequentially. By this, a decorative sheet having a favorable appearance can be obtained. In the present embodiment, the chill roll 7 corresponds to the first chill roll, and its temperature is set to 50° C. to 90° C., preferably 70° C. to 80° C. The chill roll 8 corresponds to the second chill roll, and its temperature is set to 20° C. to 70° C., preferably 50° C. to 60° C. such that its temperature is lower than the temperature of the chill roll 7. The chill roll 6 corresponds to the third chill roll, and its temperature is set to a temperature which is higher than the temperature of the chill roll 7 but lower than the temperature of the laminated sheet 14 (which is usually about 90° C. to 150° C., preferably about 100° C. to 120° C.).

The detachment/removal of the film base material and the release coating layer of the transfer film (b) 2 is carried out after Step (α) but before proceeding to Step (β), using a guide roll 12; after Step (13) but before proceeding to Step (γ), using a guide roll 13; or after Step (γ); to provide a decorative sheet as a laminated sheet having, from the surface, the resin coating, the hot-melt adhesive layer, and the thermoplastic resin film (a) 1.

Thermoplastic Resin Film (a)

The thermoplastic resin film (a) is not limited, and an arbitrary film may be used as the thermoplastic resin film (a). Examples of the thermoplastic resin film (a) include films of polyvinyl chloride-based resins such as polyvinyl chloride and vinyl chloride-vinyl acetate copolymers; polyester-based resins such as aromatic polyesters and aliphatic polyesters; polyolefin-based resins such as polyethylene, polypropylene, and polymethylpentene; styrene-based resins such as polystyrene, acrylonitrile-butadiene-styrene copolymer resins (ABS resins), styrene-ethylene-butadiene-styrene copolymers, styrene-ethylene-propylene-styrene copolymers, and styrene-ethylene-ethylene-propylene-styrene copolymers; acryl-based resins such as methyl poly(meth)acrylate; polycarbonate-based resins, cellulose-based resins such as cellophane, triacetyl cellulose, diacetyl cellulose, and acetyl cellulose butyrate; polyvinylidene chloride-based resins; fluorine-containing resins such as polyvinylidene fluoride; other resins such as polyvinyl alcohol, ethylene vinyl alcohol, polyether ether ketone, nylon, polyamide, polyimide, polyurethane, polyetherimide, polysulfone, and polyethersulfone; resin mixtures comprising one or more of these resins; and resin compositions thereof. These films include unstretched films, uniaxially stretched films, and biaxially stretched films. These films also include laminated films having two or more layers of one or more of these films.

The thermoplastic resin film used for formation of the thermoplastic resin film (a) may contain one or more of pigments, inorganic fillers, organic fillers, and resin fillers; additives such as lubricants, antioxidants, weathering agents, heat stabilizers, mold release agents, nucleating agents, antistatic agents, and surfactants; and plasticizers; as long as the object of the present invention is not impaired.

Among these, polyvinyl chloride-based resin films, amorphous or low-crystallinity aromatic polyester-based resin films, and polyolefin-based resin films are preferred. In cases where the decorative sheet is subjected to membrane press forming, vacuum forming, vacuum pressure forming, wrapping forming, or the like, the film is especially preferably a polyvinyl chloride-based resin film, or an amorphous or low-crystallinity aromatic polyester-based resin film.

Examples of the polyvinyl chloride-based resin to be used for the formation of the polyvinyl chloride-based resin film include polyvinyl chloride (vinyl chloride homopolymers); vinyl chloride-based copolymers of vinyl chloride and other monomers copolymerizable with vinyl chloride, such as vinyl chloride-vinyl acetate copolymers, vinyl chloride-(meth)acrylic acid copolymers, vinyl chloride-methyl (meth)acrylate copolymers, vinyl chloride-ethyl (meth)acrylate copolymers, vinyl chloride-maleate copolymers, vinyl chloride-ethylene copolymers, vinyl chloride-propylene copolymers, vinyl chloride-styrene copolymers, vinyl chloride-isobutylene copolymers, vinyl chloride-vinylidene chloride copolymers, vinyl chloride-styrene-maleic anhydride ternary copolymers, vinyl chloride-styrene-acrylonitrile ternary copolymers, vinyl chloride-butadiene copolymers, vinyl chloride-isoprene copolymers, vinyl chloride-chlorinated propylene copolymers, vinyl chloride-vinylidene chloride-vinyl acetate ternary copolymers, vinyl chloride-acrylonitrile copolymers, and copolymers of vinyl chloride and various vinyl ethers; and products produced by modification (for example, chlorination) of polyvinyl chloride or a vinyl chloride-based copolymer, such as after-chlorinated vinyl copolymers. Examples of the resin also include chlorinated polyolefins having chemical structures similar to that of polyvinyl chloride, such as chlorinated polyethylene. As the polyvinyl chloride-based resin, one of these or a mixture of two or more of these may be used.

The polyvinyl chloride-based resin may also contain another resin that is usually used for polyvinyl chloride-based resin compositions. The ratio of the another resin contained in the polyvinyl chloride-based resin may be arbitrary as long as the object of the present invention is not impaired. The ratio is generally 0 to 40% by mass, preferably 0 to 30% by mass, more preferably 5 to 25% by mass.

Examples of the another resin include ethylene-vinyl acetate copolymers; ethylene-(meth)acrylic acid copolymers, ethylene-methyl (meth)acrylate copolymers; ethylene-ethyl (meth)acrylate copolymers; and core-shell rubbers such as methacrylate-styrene/butadiene rubber graft copolymers, acrylonitrile-styrene/butadiene rubber graft copolymers, acrylonitrile-styrene/ethylene-propylene rubber graft copolymers, acrylonitrile-styrene/acrylate graft copolymers, methacrylate/acrylate rubber graft copolymers, and methacrylate-acrylonitrile/acrylate rubber graft copolymers. As the another resin, one of these or a mixture of two or more of these may be used.

The polyvinyl chloride-based resin may also contain a plasticizer that is usually used for polyvinyl chloride-based resin compositions. The amount of the plasticizer to be contained is usually about 0 to 40 parts by mass with respect to 100 parts by mass of the total of the polyvinyl chloride-based resin and the another resin.

Examples of the plasticizer include phthalate-based plasticizers such as di-2-ethylhexyl phthalate, dibutyl phthalate, butylhexyl phthalate, diheptyl phthalate, dioctyl phthalate, diisononyl phthalate, diisodecyl phthalate, dilauryl phthalate, dicyclohexyl phthalate, and dioctyl terephthalate; adipate-based plasticizers such as di(2-ethylhexyl) adipate, dioctyl adipate, diisononyl adipate, and diisodecyl adipate di(butyl diglycol) adipate; polyester-based plasticizers prepared by using a polyol such as ethylene glycol, diethylene glycol, triethylene glycol, 1,2-propylene glycol, 1,3-propylene glycol, 1,3-butanediol, 1,4-butanediol, 1,5-hexanediol, 1,6-hexanediol, or neopentyl glycol, using a dibasic acid such as oxalic acid, malonic acid, succinic acid, glutaric acid, adipic acid, pimelic acid, suberic acid, azelaic acid, sebacic acid, phthalic acid, isophthalic acid, or terephthalic acid, and using, if necessary, a stopper such as a monohydric alcohol or a monocarboxylic acid; epoxidized products of vegetable oils, such as epoxidized soybean oils and epoxidized linseed oils; epoxy-based plasticizers such as ethylhexyl epoxystearate; and other plasticizers such as trimellitic acid-based plasticizers, cyclohexane dicarboxylate-based plasticizers, tetrahydrophthalic acid diester-based plasticizers, glycerin ester-based plasticizers, epoxy hexahydrophthalic acid diester-based plasticizers, isosorbide diester-based plasticizers, phosphate-based plasticizer systems, azelaic acid-based plasticizers, sebacic acid-based plasticizers, stearic acid-based plasticizers, citric acid-based plasticizers, pyromellitic acid-based plasticizers, biphenyltetracarboxylate-based plasticizers, and chlorine-based plasticizers. As the plasticizer, one of these or a mixture of two or more of these may be used.

If desired, the polyvinyl chloride-based resin may also contain a substance that is usually used for polyvinyl chloride-based resin compositions. Examples of the arbitrary component include pigments, inorganic fillers, organic fillers, and resin fillers; and additives such as lubricants, antioxidants, weathering agents, heat stabilizers, nucleating agents, mold release agents, antistatic agents, urea-formaldehyde waxes, and surfactants. The amount of the arbitrary component to be contained is usually about 0.01 to 50 parts by mass with respect to 100 parts by mass of the total of the polyvinyl chloride-based resin and the another resin.

Examples of the amorphous or low-crystallinity aromatic polyester-based resin to be used for formation of the amorphous or low-crystallinity aromatic polyester-based resin film include polyester-based copolymers of an aromatic polyvalent carboxylic acid component such as terephthalic acid, isophthalic acid, orthophthalic acid, or naphthalenedicarboxylic acid, and a polyol component such as ethylene glycol, diethylene glycol, neopentylglycol, 1,2-butanediol, 1,3-butanediol, 1,4-butanediol, 1,5-pentanediol, 3-methyl-1,5-pentanediol, 2-methyl-1,3-propanediol, or 1,4-cyclohexanedimethanol. More specifically, examples of the above resin include glycol-modified polyethylene terephthalate (PETG) containing 45 to 50 mol % terephthalic acid, 30 to 40 mol % ethylene glycol, and 10 to 20 mol % 1,4-cyclohexanedimethanol; glycol-modified polycyclohexylene dimethylene terephthalate (PCTG) containing 45 to 50 mol % terephthalic acid, 16 to 21 mol % ethylene glycol, and 29 to 34 mol % 1,4-cyclohexane dimethanol; acid-modified polycyclohexylene dimethylene terephthalate (PCTA) containing 25 to 49.5 mol % terephthalic acid, 0.5 to 25 mol % isophthalic acid, and 45 to 50 mol % 1,4-cyclohexanedimethanol; acid-modified and glycol-modified polyethylene terephthalate containing 30 to 45 mol % terephthalic acid, 5 to 20 mol % isophthalic acid, 35 to 48 mol % ethylene glycol, 2 to 15 mol % neopentyl glycol, less than 1 mol % diethylene glycol, and less than 1 mol % bisphenol A; and copolymers containing 45 to 50 mol % terephthalic acid, 0 to 5 mol % isophthalic acid, 25 to 45 mol % 1,4-cyclohexane dimethanol, and 5 to 25 mol % 2,2,4,4-tetramethyl-1,3-cyclobutanediol; when the total amount of monomers is defined as 100 mol %. These resins may be used individually, or as a mixture of two or more thereof.

In the present description, polyesters having a melting calorie of not more than 10 J/g were defined as amorphous polyesters, and polyesters having a melting calorie of more than 10 J/g and not more than 60 J/g were defined as low-crystallinity polyesters, wherein determination of the melting calorie was based on a melting curve obtained by carrying out DSC measurement using a Diamond DSC type differential scanning calorimeter manufactured by PerkinElmer Co., Ltd. with a temperature program with which the sample is maintained at 320° C. for 5 minutes and then cooled to −50° C. at a cooling rate of 20° C./minute, followed by being maintained at −50° C. for 5 minutes and then heated to 320° C. at a heating rate of 20° C./minute.

The amorphous or low-crystallinity aromatic polyester-based resin may also contain another component, if necessary. Examples of the arbitrary component that may be contained include thermoplastic resins other than the amorphous or low-crystallinity aromatic polyester-based resin; pigments, inorganic fillers, organic fillers, and resin fillers; and additives such as lubricants, antioxidants, weathering agents, heat stabilizers, mold release agents, nucleating agents, antistatic agents, and surfactants. The amount of the arbitrary component to be contained is usually about 0.01 to 50 parts by mass with respect to 100 parts by mass of the amorphous or low-crystallinity aromatic polyester-based resin.

Preferred examples of the arbitrary component include core-shell rubbers. Use of a core-shell rubber improves the impact resistance. Examples of the core-shell rubber include methacrylate-styrene/butadiene rubber graft copolymers, acrylonitrile-styrene/butadiene rubber graft copolymers, acrylonitrile-styrene/ethylene-propylene rubber graft copolymers, acrylonitrile-styrene/acrylate graft copolymers, methacrylate/acrylate rubber graft copolymers, and methacrylate-acrylonitrile/acrylate rubber graft copolymers. As the core-shell rubber, one of these or a mixture of two or more of these may be used.

From the viewpoint of increasing the impact resistance, the amount of the core-shell rubber to be contained is preferably not less than 0.5 part by mass, more preferably not less than 1 part by mass with respect to 100 parts by mass of the amorphous or low-crystallinity aromatic polyester-based resin. The amount is usually not more than 50 parts by mass, preferably not more than 45 parts by mass.

Examples of the film base material to be used for the transfer film (b) include biaxially stretched polyethylene terephthalate films having a thickness of 10 μm to 200 μm, preferably a thickness of 10 μm to 50 μm.

Examples of the release coating agent to be used for formation of the release coating layer include, but are not limited to, wax-based coating agents such as polyethylene waxes and paraffin waxes; silicone-based coating agents; fluorine-based coating agents; alkyl acrylate-based coating agents; inorganic coating agents; and organic-inorganic hybrid coating agents.

The method for forming the release coating layer using the release coating agent is not limited, and a known web application method may be used. Specific examples of the method include roll coating, gravure coating, reverse coating, roll brushing, spray coating, air knife coating, and die coating.

In cases where the decorative sheet obtained by the method of the present invention is subjected to the so-called three-dimensional forming such as membrane press forming, vacuum forming, or vacuum pressure forming, a thermoplastic resin composition coating material is preferably used as the coating material to be used for the formation of the resin coating.

The thermoplastic resin composition coating material is a coating material which is prepared by dissolving a thermoplastic resin in an organic solvent, and which enables formation of a resin coating by its application and drying. Examples of the thermoplastic resin include urethane-based resins, polyester-based resins, acryl-based resins, vinyl acetate-based resins, vinyl chloride-based resins, silicone-based resins, and fluorine-based resins. Among these, urethane-based resins, polyester-based resins, and acryl-based resins are preferred. As the thermoplastic resin, one of these or a mixture of two or more of these may be used.

Examples of the organic solvent include 1-methoxy-2-propanol, ethyl acetate, n-butyl acetate, toluene, methyl ethyl ketone, methyl isobutyl ketone, diacetone alcohol, and acetone. As the organic solvent, one of these or a mixture of two or more of these may be used.

If necessary, the thermoplastic resin composition coating material may also contain one or more of additives such as antistatic agents, surfactants, leveling agents, thixotropy-imparting agents, fouling inhibitors, printability-improving agents, antioxidants, weathering agents, light stabilizers, UV absorbers, heat stabilizers, coloring agents, and fillers.

The thermoplastic resin composition coating material is obtained by mixing and stirring these components.

In cases where the decorative sheet obtained by the method of the present invention is subjected to the so-called two-dimensional forming such as wrapping processing, an active energy ray-curable resin composition may be used as the coating material to be used for the formation of the resin coating. Further, in recent years, active energy ray-curable resin compositions that are applicable to membrane press forming, vacuum forming, and vacuum pressure forming have been proposed (for example, JP 2013-064098 A).

The active energy ray-curable resin compositions described above are capable of forming a hard coating by polymerization/curing upon irradiation with an active energy ray such as UV or an electron beam. Examples of the active energy ray-curable resin compositions include compositions containing an active energy ray-curable resin together with a compound having two or more isocyanate groups (—N=C=O) in each molecule and/or a photopolymerization initiator.

Examples of the active energy ray-curable resin include resins composed of one or more selected from, or resins comprising as constituting monomers one or more of, (meth) acryloyl group-containing prepolymers and oligomers such as polyurethane (meth)acrylate, polyester (meth)acrylate, polyacryl (meth)acrylate, epoxy (meth)acrylate, polyalkylene glycol poly(meth)acrylate, and polyether (meth)acrylate; (meth)acryloyl group-containing monofunctional reactive monomers such as methyl (meth)acrylate, ethyl (meth) acrylate, n-butyl (meth)acrylate, hexyl (meth)acrylate, 2-ethylhexyl (meth)acrylate, lauryl (meth)acrylate, isobornyl (meth)acrylate, dicyclopentenyl (meth)acrylate, dicyclopentenyloxyethyl (meth)acrylate, phenyl (meth)acrylate, phenyl cellosolve (meth)acrylate, 2-methoxyethyl (meth) acrylate, hydroxyethyl (meth)acrylate, hydroxypropyl (meth)acrylate, 2-acryloyloxyethyl hydrogen phthalate, dimethylaminoethyl(meth)acrylate, trifluoroethyl (meth) acrylate, and trimethylsiloxyethyl methacrylate; monofunctional reactive monomers such as N-vinylpyrrolidone and styrene; (meth)acryloyl group-containing bifunctional reactive monomers such as diethylene glycol di(meth)acrylate, neopentyl glycol di(meth)acrylate, 1,6-hexanediol di(meth) acrylate, polyethylene glycol di(meth)acrylate, 2,2'-bis(4-(meth)acryloyloxypolyethyleneoxyphenyl) propane, and 2,2'-bis(4-(meth)acryloyloxypolypropyleneoxyphenyl) propane; (meth)acryloyl group-containing trifunctional reactive monomers such as trimethylolpropane tri(meth)acrylate and trimethylolethane tri(meth)acrylate; (meth)acryloyl group-containing tetrafunctional reactive monomers such as pentaerythritol tetra(meth)acrylate; (meth)acryloyl group-containing hexafunctional reactive monomers such as dipentaerythritol hexaacrylate; and the like. As the active energy ray-curable resin, one of these or a mixture of two or more of these may be used.

In the present description, (meth)acrylate means acrylate or methacrylate.

Examples of the compound having two or more isocyanate groups in each molecule include methylenebis-4-cyclohexyl isocyanate; polyisocyanates such as trimethylolpropane adducts of tolylene diisocyanate, trimethylolpropane adducts of hexamethylene diisocyanate, trimethylolpropane adducts of isophorone diisocyanate, isocyanurate-modified compounds of tolylene diisocyanate, isocyanurate-modified compounds of hexamethylene diisocyanate, isocyanurate-modified compounds of isophorone diisocyanate, and biuret-modified compounds of hexamethylene diisocyanate; and urethane cross-linking agents such as block-type isocyanates of these polyisocyanates. These may be used individually, or two or more of these may be used in combination. For the cross-linking, a catalyst such as dibutyltin dilaurate or dibutyltin diethylhexoate may be added.

Examples of the photopolymerization initiator include benzophenone-based compounds such as benzophenone, methyl-o-benzoylbenzoate, 4-methylbenzophenone, 4,4'-bis (diethylamino) benzophenone, methyl o-benzoylbenzoate, 4-phenylbenzophenone, 4-benzoyl-4'-methyldiphenyl sulfide, 3,3',4,4'-tetra(tert-butylperoxycarbonyl) benzophenone, and 2,4,6-trimethylbenzophenone; benzoin-based compounds such as benzoin, benzoin methyl ether, benzoin ethyl ether, benzoin isopropyl ether, and benzyl methyl ketal; acetophenone-based compounds such as acetophenone, 2,2-dimethoxy-2-phenylacetophenone, and 1-hydroxycyclohexyl phenyl ketone; anthraquinone-based compounds such as methylanthraquinone, 2-ethylanthraquinone, and 2-amylanthraquinone; thioxanthone-based compounds such as thioxanthone, 2,4-diethylthioxanthone, and 2,4-diisopropylthioxanthone; alkylphenone-based corn pounds such as acetophenone dimethyl ketal; triazine-based compounds; biimidazole compounds; acylphosphine oxide-based compounds; titanocene-based compounds; oxime ester-based compounds; oxime phenyl acetate-based compounds; hydroxy ketone-based compounds; and a minobenzoate-based compounds. These may be used individually, or two or more of these may be used in combination.

If necessary, the active energy ray-curable resin composition may also contain one or more of additives such as antistatic agents, surfactants, leveling agents, thixotropy-imparting agents, fouling inhibitors, printability-improving agents, antioxidants, weathering agents, light stabilizers, UV absorbers, heat stabilizers, coloring agents, and fillers.

For dilution of the active energy ray-curable resin composition to a concentration at which it can be easily applied, it may contain a solvent, if necessary. The solvent is not limited as long as it does not react with components of the curable resin composition or with other arbitrary components, and as long as it does not catalyze (promote) self-reaction (including deteriorative reaction) of these components. Examples of the solvent include 1-methoxy-2-propanol, ethyl acetate, n-butyl acetate, toluene, methyl ethyl ketone, methyl isobutyl ketone, diacetone alcohol, and acetone.

The active energy ray-curable resin composition is obtained by mixing and stirring these components.

The method for forming the resin coating using the coating material for formation of the resin coating is not limited, and a known web application method may be used. Specific examples of the method include roll coating, gravure coating, reverse coating, roll brushing, spray coating, air knife coating, and die coating.

The thickness of the resin coating is preferably not less than 5 µm, more preferably not less than 10 µm from a design point of view. On the other hand, from the viewpoint of ease of handling of the web and workability during the formation of the resin coating, the thickness of the resin coating is preferably not more than 100 µm, more preferably not more than 50 µm.

The hot-melt adhesive to be used for the hot-melt adhesive layer is not limited, and an arbitrary hot-melt adhesive may be used. Examples of the hot-melt adhesive include hot-melt adhesives such as ethylene-vinyl acetate copolymer resins, polyester-based resins, polyurethane-based resins, and polyamide-based resins. As the hot-melt adhesive, one of these or a mixture of two or more of these may be used.

EXAMPLES

The present invention is described below by way of Examples, but the present invention is not limited to these.
Materials Used
(A) Thermoplastic Resin Film (a)

(A-1) A laminated film of a white polyvinyl chloride-based resin film having a thickness of 200 μm and a transparent polyvinyl chloride-based resin film having a thickness of 80 μm.

(A-2) A laminated film of
a white resin film having a thickness of 200 μm composed of a polyester-based resin composition containing 100 parts by mass of an amorphous aromatic polyester-based resin manufactured by Eastman Chemical Company "KODAK PETG GS1 (trade name)", 2 parts by mass of a core-shell rubber (methacrylate-acrylonitrile/butyl acrylate graft copolymer) manufactured by Kaneka Corporation "Kane Ace FM-40 (trade name)", 0.5 part by mass of a lubricant manufactured by Cognis Japan Co., Ltd. "Loxiol G78 (trade name)", and 12 parts by mass of titanium oxide (white pigment) manufactured by Ishihara Sangyo Kaisha, Ltd. "Tipaque CR-60-2 (trade name)", and
a transparent resin film having a thickness of 80 μm composed of an amorphous aromatic polyester-based resin manufactured by Eastman Chemical Company "KODAR PETG GS1 (trade name)".
(B) Transfer Film (b)

(B-1) A transfer film prepared by forming a release coating layer having a thickness of 0.2 μm composed of a polyethylene wax on one side of a biaxially stretched polyethylene terephthalate-based resin film having a thickness of 12 μm, forming a thermoplastic urethane-based resin coating having a thickness of 0.4 μm on the release coating layer, and forming a polyester-based hot-melt adhesive layer having a thickness of 0.4 μm on the resin coating.

Example 1

FIG. 1 shows a schematic diagram of the apparatus used. On the heating drum 3 whose temperature was set to 180° C., the (A-1) was pressed by the pressure roll 9 such that the white polyvinyl chloride-based resin film was positioned in the heating drum 3 side. The (B-1) was then pressed by the pressure roll 10 on the (A-1) such that the hot-melt adhesive layer was positioned in the (A-1) side, to obtain a pressed body. At the guide roll 11, the thus obtained pressed body was released from the heating drum 3. The pressed body obtained as described above was fed and compressed between the design-imparting roll 4 which is preheated at a temperature of 110° C. and which is rotating in the direction indicated by an arrow, and the receiving roll 5 which is rotating in the direction indicated by an arrow, such that the (B-1) is positioned in the design-imparting-roll-4 side, to obtain a laminated sheet 14. Here, for imparting a high-gloss design, a mirror-surface metal roll was used as the design-imparting roll 4. The temperature of the laminated sheet 14 as measured using an infrared thermography manufactured by Nippon Avionics Co., Ltd. "Handy Thermo TVS-200 (trade name)" was 105° C. Subsequently, the sheet was passed sequentially through the chill roll 6 whose temperature was set to 90° C.; the chill roll 7 whose temperature was set to 75° C.; and then the chill roll 8 whose temperature was set to 50° C. A decorative sheet having a favorable appearance could be obtained thus above.

Example 2

The process was carried out in the same manner as in Example 1 except that the (A-2) was used instead of the (A-1). As a result, a decorative sheet having a favorable appearance could be obtained.

Comparative Example 1

The process was carried out in the same manner as in Example 1 except that the chill roll 6 was not used, and that the temperatures of the chill rolls 7 and 8 were set to 30° C. As a result, the resin coating developed poor external appearance such as wrinkles.

Comparative Example 2

The process was carried out in the same manner as in Example 2 except that the chill roll 6 was not used, and that the temperatures of the chill rolls 7 and 8 were set to 30° C. As a result, the resin coating had poor external appearance such as wrinkles.

Embodiments of the present invention were described above. Based on the above description, various kinds of alternative cases, modification, and alteration are possible by those skilled in the art. The present invention includes such various kinds of alternative cases, modification, and alteration without departing from the spirit of the present invention.

DESCRIPTION OF SYMBOLS

1. Thermoplastic resin film (a)
2. Transfer film (b)
3. Heating drum
4. Design-imparting roll
5. Receiving roll
6. Chill roll
7. Chill roll
8. Chill roll
9. Pressure roll
10. Pressure roll
11. Guide roll
12. Guide roll
13. Guide roll
14. Laminated sheet
15. Sweeper roll

The invention claimed is:
1. A method for producing a decorative sheet comprising the steps of:
   (α) pressing a thermoplastic resin film (a) on a preheated rotating heating drum, and then pressing a transfer film (b) having a hot-melt adhesive layer, a resin coating, a release coating layer, and a film base material in order from the outermost-layer side on the film (a) such that the hot-melt adhesive layer is positioned in the film (a) side;
   (β) feeding or supplying a pressed body obtained in the Step (α) between a rotating design-imparting roll and a rotating receiving roll such that the transfer film (b) is positioned in the design-imparting-roll side; and
   (γ) sequentially passing a laminated sheet obtained in the Step (β) through a first chill roll whose temperature is set to 50° C. to 90° C. and a second chill roll whose temperature is set to a temperature of 20° C. to 70° C. which is lower than the first-chill roll temperature to cool the laminated sheet.

2. The method according to claim 1, wherein a third chill roll is provided before the first chill roll, and the temperature of the third chill roll is set to a temperature which is higher than the temperature of the first chill roll and lower than the temperature of the laminated sheet obtained in the Step ($\beta$).

3. The method according to claim 1, wherein a sweeper roll is pressed on each of any one or more selected from the group consisting of the design-imparting roll, receiving roll, heating drum, first chill roll, second chill roll, and third chill roll.

4. A decorative sheet produced by the method according to claim 1.

5. The method according to claim 2, wherein a sweeper roll is pressed on each of any one or more selected from the group consisting of the design-imparting roll, receiving roll, heating drum, first chill roll, second chill roll, and third chill roll.

6. A decorative sheet produced by the method according to claim 2.

7. A decorative sheet produced by the method according to claim 3.

8. A decorative sheet produced by the method according to claim 5.

* * * * *